United States Patent
Harnisch

(10) Patent No.: US 9,553,992 B1
(45) Date of Patent: Jan. 24, 2017

(54) AUTOMATED EMERGENCY NOTIFICATION SYSTEM

(71) Applicant: Al Harnisch, Hackensack, NJ (US)

(72) Inventor: Al Harnisch, Hackensack, NJ (US)

( * ) Notice: Subject to any disclaimer, the term of this patent is extended or adjusted under 35 U.S.C. 154(b) by 0 days.

(21) Appl. No.: 15/141,936

(22) Filed: Apr. 29, 2016

(51) Int. Cl.
*H04M 11/00* (2006.01)
*H04M 3/537* (2006.01)
*H04M 1/82* (2006.01)
*H04Q 1/30* (2006.01)

(52) U.S. Cl.
CPC ............. *H04M 3/537* (2013.01); *H04M 1/82* (2013.01); *H04Q 1/30* (2013.01); *H04M 2203/658* (2013.01); *H04M 2242/26* (2013.01); *H04Q 2213/13374* (2013.01)

(58) Field of Classification Search
CPC .... H04M 3/537; H04M 1/82; H04M 2242/26; H04M 2203/658; H04M 11/04; H04M 11/045; H04Q 1/30; H04Q 2213/13374
USPC .............. 379/37–41; 340/531, 521
See application file for complete search history.

(56) References Cited

U.S. PATENT DOCUMENTS

| | | | |
|---|---|---|---|
| 7,460,020 B2 | 12/2008 | Reyes et al. | |
| 8,427,297 B1 | 4/2013 | Markey et al. | |
| 9,054,885 B2 | 6/2015 | Samuels | |
| 9,286,790 B2 * | 3/2016 | Lyman | G08B 25/12 |
| 2014/0368643 A1 | 12/2014 | Siegel et al. | |
| 2015/0038109 A1 | 2/2015 | Salahshour | |
| 2015/0048932 A1 | 2/2015 | Helms | |
| 2015/0117619 A1 * | 4/2015 | Carpenter | H04M 3/5116 379/39 |

FOREIGN PATENT DOCUMENTS

| | | |
|---|---|---|
| WO | WO9926208 | 5/1999 |
| WO | WO2006034246 | 3/2006 |
| WO | WO2014116969 | 7/2014 |

* cited by examiner

*Primary Examiner* — Stella Woo
(74) *Attorney, Agent, or Firm* — Goldstein Law Offices, P.C.

(57) ABSTRACT

An automated notification system for use in a facility, including a telephone system, a controller, a paging system, and a warning system. The warning system includes warning lights, warning speakers, and warning displays. The telephone system includes extension handsets, and the paging system includes paging speakers. The extension handsets, paging speakers, warning speakers, warning lights, and warning displays are distributed throughout the facility. An alert condition may be activated using one of the extension handsets or by an activation device within the facility. Upon detection of an alert condition, the controller actuates the warning system and uses the paging system to provide audible and visual warnings throughout the facility, and provides outgoing notification to emergency personnel through the telephone system. Remote units located in outlying areas around the facility are wirelessly signaled by the control unit to provide appropriate warnings in such locations.

13 Claims, 5 Drawing Sheets

AUTOMATED EMERGENCY NOTIFICATION SYSTEM

TECHNICAL FIELD

The present disclosure relates generally to an automated notification system. More particularly, the present disclosure relates to integrating telephone and paging systems with other warning system devices in a facility to provide a comprehensive, automated emergency notification and warning system.

BACKGROUND

When an emergency situation occurs at a highly populated facility, such as a school, rapid and clear communication is often the difference between experiencing minimum and massive casualties. Scores of examples exist where casualties were directly attributed to a communication failure.

Among the possible emergency situations that might arise, a mass shooting probably the most ominous. Mass shootings at schools and other institutions has become a frightening reality that has occurred with increasing frequency over the past several years. In response, schools have sought to take every available precaution and safety measure in preparation for the unthinkable.

It is especially the case in school shootings that having effective procedures in place, coupled with immediate notification to initiate those procedures, is the most effective way to save lives. Clearly then, the completeness of any notification solution is a function of both the ease with which the emergency notification system can be triggered when an emergency occurs, and the comprehensiveness of the measures taken in response.

Most currently available or proposed solutions fall short in the ease of triggering the system when necessary. This problem sometimes stems from the difficulty of activation—such as by requiring cumbersome authentication or some other requirement that is difficult to carry out in the course of an emergency. It may also stem from 'lack of coverage'—where the physical locations from which the system can be activated are not always convenient to all areas where an emergency situation may be spotted. As a result, when the system is inconvenient to activate, it greatly increases the possibility that lock down, shelter in place, or other emergency procedures, will not be initiated when necessary.

Many systems also fall short in the comprehensiveness of measures taken in response to its activation. In particular, notification of the emergency situation might not reach all key personnel—placing them and others at risk. This is often the case when a facility, such as a school, extends beyond a single building, or has significant outdoor facilities. It is often not feasible to provide a wired solution that effectively covers such a facility. The result is that many people at risk might not be notified of the emergency.

Perhaps even more important, many systems fall short because they are prone to human error or require personnel to take significant action during what is obviously a very stressful situation. Thus, it is unrealistic to place the onus on personnel to call emergency services, inform them about the situation, and simultaneously make a public address that calmly and clearly informs others of the situation, and activate any emergency alarm system—all while serious and potentially life threatening events are unfolding.

It is well known that in such situations, time is everything. Often the situation will have fully played out well before law enforcement arrives on the scene. The speed on activation is critical, and this is where most solutions fail to provide an effective solution.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an emergency notification system that may be easily and conveniently activated to provide comprehensive and immediate warning notification throughout a facility. Accordingly, the present disclosure provides an emergency notification system that employs a notification system controller integrated with a telephone system and paging system. The telephone system has telephone extension handsets throughout the facility, and the paging system has numerous paging speakers distributed throughout the facility. An alert condition in the controller can be triggered using any of the telephone extensions or using dedicated triggering devices. In response, emergency warning messages are automatically provided by the paging system and other warning devices within the facility, as well as to remote units at outlying areas of the facility, and to emergency personnel outside of the facility.

It is an aspect of an example embodiment in the present disclosure to provide an emergency notification system that is configured to prevent false triggering while maintaining ease of activation. Accordingly the system may be configured to initiate activation by dialing a code on one of the telephone system extension handsets, generating ring signals on two distinct line outputs simultaneously in response thereto, wherein the notification system controller is activated with an alert condition upon the simultaneous detection by the controller of ring signals on both of said lines. A recording may be provided to personnel dialing the code, indicating that the alert condition will be initiated if the caller does not hang up, thereby providing an additional safeguard against mistaken activation.

It is yet another aspect of an example embodiment in the present disclosure to provide an emergency warning system that can be activated and initiate warning notifications within twenty seconds. Accordingly, even when activated by telephone extension with an outgoing message and time delay intended to prevent false alarms, activation of all warning systems will happen within less than twenty seconds.

Accordingly, the present disclosure describes an automated notification system, for use in a facility, including a telephone system, a controller, a paging system, and a warning system. The warning system includes warning lights, warning speakers, and warning displays. The telephone system includes extension handsets, and the paging system includes paging speakers. The extension handsets, the paging speakers, the warning speakers, the warning lights, and warning displays are distributed throughout the facility. An alert condition may be activated using one of the extension handsets or by an activation device within the facility. Upon detection of an alert condition, the controller actuates the warning system and uses the paging system to provide audible and visual warnings throughout the facility, and provides outgoing notification to emergency personnel through the telephone system. Remote units located in outlying areas around the facility are wirelessly signaled by the control unit to provide appropriate warnings in such locations.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
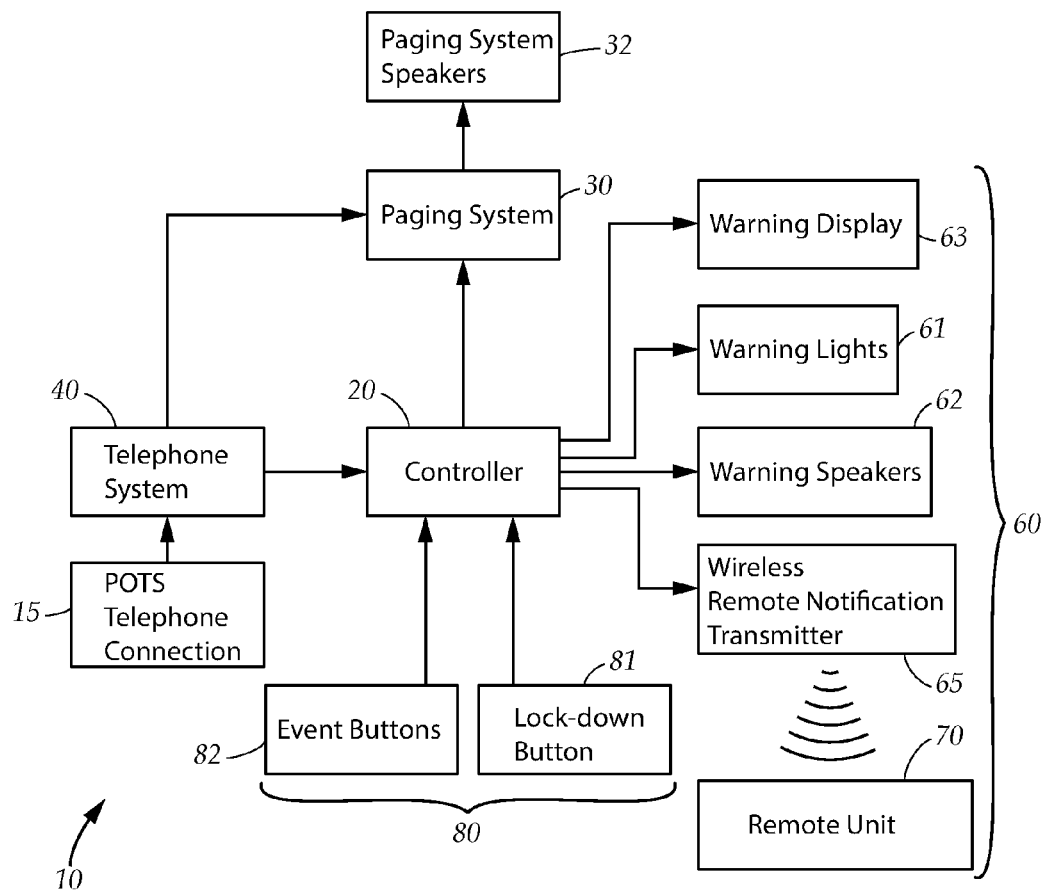
FIG. 1 is a functional block diagram, illustrating interconnection of various components of an embodiment of the notification system according to the present disclosure.

FIG. 1 illustrates an emergency notification system 10, having a notification system controller 20 that provides, facilitates, and orchestrates key functionality of the system 10. The emergency notification system 10 also has a paging system 30 and a telephone system 40 that are connected to the notification system controller 20. At least one triggering device 80 is connected to the controller 20 to initiate an alert condition. A warning system 60 is connected to the controller 20 to provide distributed notification when the alert condition is determined.

The telephone system 40 is connected to a POTS telephone network connection 15 that provides connectivity to telephonic devices worldwide through conventional ten digit domestic dialing, extended digit long distance dialing, or the like. Through this connection, warning notifications can be sent to telephones, cell phones, pagers, or any other telephonic device reachable through the POTS telephone network. In addition, incoming calls from the POTS telephone network can be used by emergency personnel to enhance notifications/warnings made by the system, as will be described further hereinbelow.

The warning system 60 contains various devices capable of audibly and visually notifying personnel of an emergency situation. In particular, the warning system 60 may contain warning lights 61 for visually indicating the presence of an emergency condition and gaining the attention of all personnel—even where there is significant ambient noise. The warning system 60 may also contain warning speakers 62 capable of playing an audible message, siren, or alert tone; and warning displays 63 capable of displaying a warning message. In addition, the warning system 60 may contain a wireless remote notification transmitter 65, and a remote unit 70 capable of receiving a wireless signal therefrom. The wireless remote notification transmitter 65 is capable of conveying the presence of the alert condition to the remote unit 70, allowing the remote unit 70 to be positioned well beyond feasible wired interconnection to the control unit 20. In addition, the paging system 30 has a plurality of paging speakers 32 to allow audible warning messages to be promulgated through the paging system 30.

Figure 5:
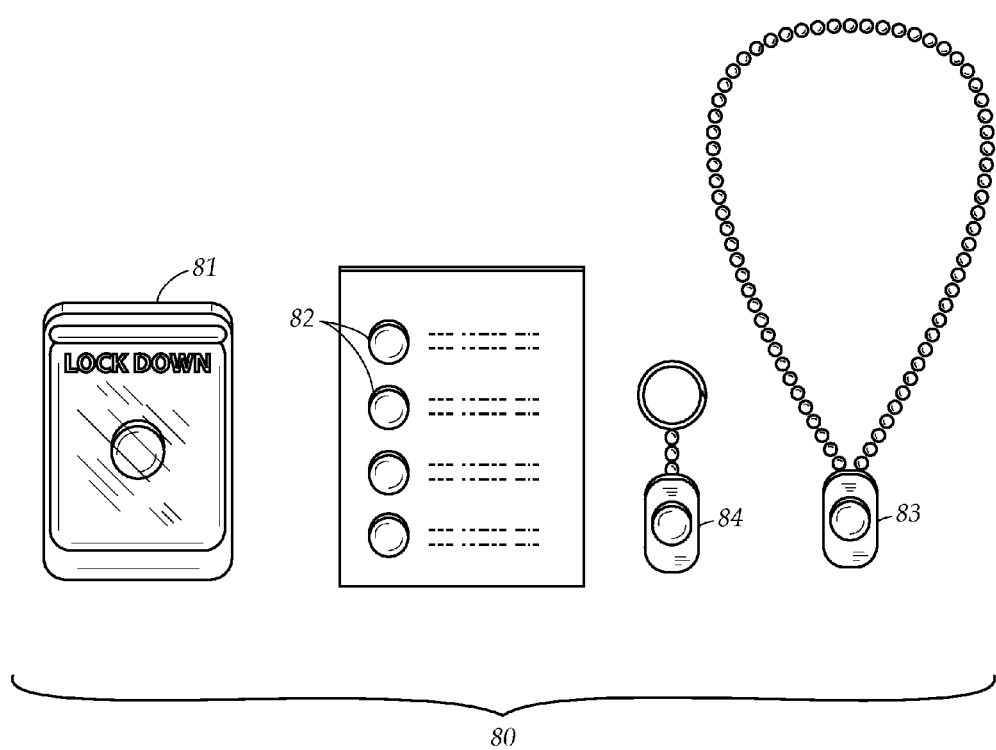
FIG. 5 is a diagrammatic perspective view, showing various embodiments of triggering devices, in accordance with the principles of the present disclosure.

The notification system 10 further comprises triggering devices 80, for signaling the controller to initiate an alert condition. Referring also to FIG. 5, the triggering devices 80 may include a lock-down button 81 which when pressed initiates the alert condition, and may also include event buttons 82 which when pressed indicate the presence of a distinctive alert condition. The lock-down button 81 is preferably provided as a brightly colored, wall-mounted device that may have a safety cover that must be lifted to press the button. The lock-down button 81 may also be located under desks or other locations where they can be discretely activated. The event buttons 82 are preferably provided in a cluster of several event buttons 82, and located in a secured location such as a main office. The event buttons 82 allow that several distinctive alert conditions to be individually selected by pressing a different one of the event buttons 82. In addition, other devices may be configured as triggering devices, including smartphone applications, wireless pendants 83, and key fobs 84. Such devices may be useful when personnel in the outlying areas notice a dangerous situation, yet are not near one of the triggering devices 80.

Figure 2:
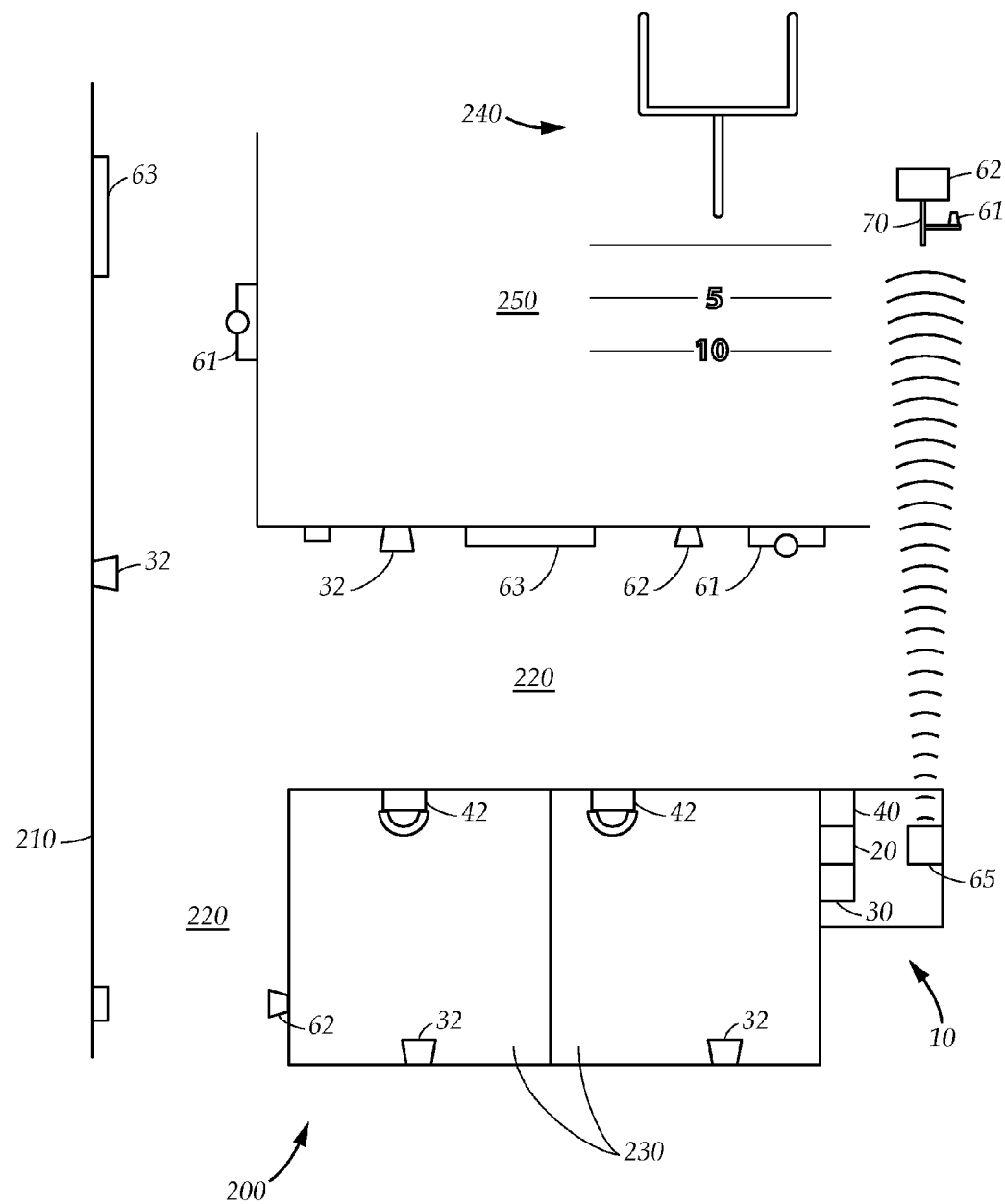
FIG. 2 is a diagrammatic plan view, illustrating a facility, and showing installation of various components of an embodiment of the notification system throughout the facility.

FIG. 2 illustrates a notification system installation within a facility 200. The facility includes a main building 210 having hallways 220 and rooms 230. In addition, the facility includes outlying areas 240 beyond the main building 210, such as an athletic field 250. In accordance with the principles of the present disclosure, the telephone system 40 and the paging system 30 are located within the main building 210, and are connected to the notification system controller 20. The telephone system 40 includes a plurality of telephone extension handsets 42 that are located throughout the main building 210, generally within each of the rooms 230. As will be discussed hereinbelow, the proliferation of telephone extension handsets 42 throughout the system is key to providing effective coverage, since each telephone extension handset 42 provides a potential trigger point for the system 10. For comprehensive notification coverage, distributed abundantly throughout the main building 210 are components of the warning system 60—namely warning lights 61, warning speakers 62, and warning displays 63. In addition, the paging system speakers 32 are provided throughout the hallways 220 and rooms 230. In the outlying areas 240, the remote units 70 are positioned to ensure that people outside of the main building 210 are warned of the alert condition. In particular, the remote unit 70 may include warning speakers 62 and warning lights 61. The wireless remote notification transmitter 65 sends a signal to the remote units 70 to actuate the warning speakers 62 and warning lights 61 when appropriate. The wireless remote notification transmitter may employ a UHF radio based notification system, that would provide a reach of approximately one mile without requiring hard wiring, or can use any other suitable wireless technology. Note that the warning speakers 65 may be self-contained such that they play a predetermined message when enabled, or they may be configured to activate remotely and play an audible warning message provided wirelessly to them. In addition, warning displays may be utilized at some outlying locations in conjunction with the remote units 70 to provide textual alert messages.

Figure 3:
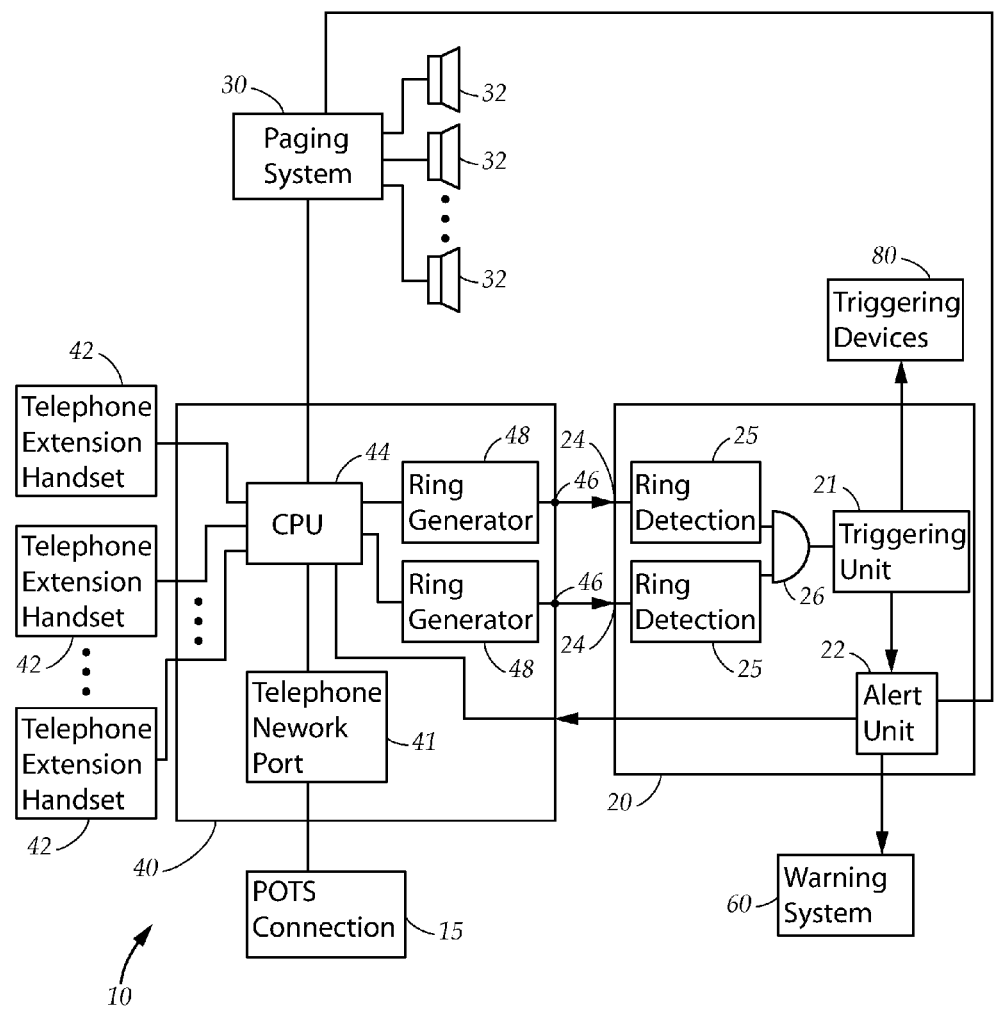
FIG. 3 is a functional block diagram, illustrating interconnection of various components of an embodiment of the notification system according to the present disclosure.

Referring to FIG. 3, an example embodiment is illustrated that shows an embodiment of the notification system 10 with additional granularity, including internal details of the telephone system 40, paging system 30, and controller 20—to better show interconnection of these components and their interplay in carrying out the desired functionality. In particular, the telephone system 40 includes a telephone network port 41 that allows interconnection to the POTS telephone network connection 15, and a CPU 44 that provides the overall functionality of the telephone system. Such functionality may include receiving and routing incoming calls, establishing a plurality of virtual or actual telephone extensions that may be mapped to the telephone extension handsets 42 or used internally, providing voicemail functionality, recording outgoing and incoming messages, facilitating programmable call routing including placing and forwarding calls, providing notifications and other communication through digital communication networks, allowing access to telephone system assets from both within and outside of the telephone system hardware, and the like.

The telephone system 40 also has a pair of line outputs 46 that may provide important functionality for triggering the alert condition as will be described in detail hereinafter. Ring generators 48 are provided on each of the line outputs 46. According to a preferred embodiment, the ring generators 48 are configured to provide an AC ring signal similar to the typical ninety-volt ring signal commonly found on analog POTS networks.

The notification system controller 20 includes a triggering unit 21 and an alert unit 22. Note that the functional designations of triggering unit and alert unit are virtual, for the sake of describing and compartmentalizing higher level functionality of the controller 20, and may be implemented with discrete components, as a combination of components, or even in software, and need not have corresponding physical counterparts within the system. Similarly, the functionality and logic may be provided by solid state electronic circuitry, as well as using electromechanical components such as relays. The functional interplay between the triggering unit 21 and alert unit 22 is that once the triggering unit 21 determines that an alert condition is present, and the alert unit 22 coordinates appropriate action in response to the alert condition being present.

Accordingly, in the context of the present disclosure, the triggering unit receives inputs from potential trigger points, including from the triggering devices 80 and from the telephone system 40. To facilitate reliable triggering from the telephone system 40, the controller 20 has a pair of phone line inputs 24 and a pair of ring detectors 25 connected thereto. The ring detectors 25 each determine the presence of a ring signal on its associated phone line input 24, and produce an output in response thereto. The outputs of both ring detectors 25 are connected to an AND gate 26. The AND gate 26 has an output that is connected to the triggering unit 21. Thus, for the triggering unit 21 to be actuated and establish an alert condition from the ring detectors 25, both ring detectors must simultaneously detect a ring signal. Note that as an example of a relatively low-tech but effective implementation, the ring detectors 25 and the AND gate 26 can be implemented using two normally open relays, with the contacts of both relays placed in series. The coils of said relays operate as the ring detectors 25, energizing the relay and closing the contacts of each relay when its associated phone line input has a ring signal present thereon. Thus, if the coils of both relays are simultaneously energized by ring signals, a path will be created through the contacts of the pair of relays that will enable the alert condition. As will be described hereinbelow, having this preferred configuration of the system 10, requiring two lines to ring simultaneously to activate the alert condition, will prevent inadvertent triggering of the system from the telephone system 40.

Figure 4:
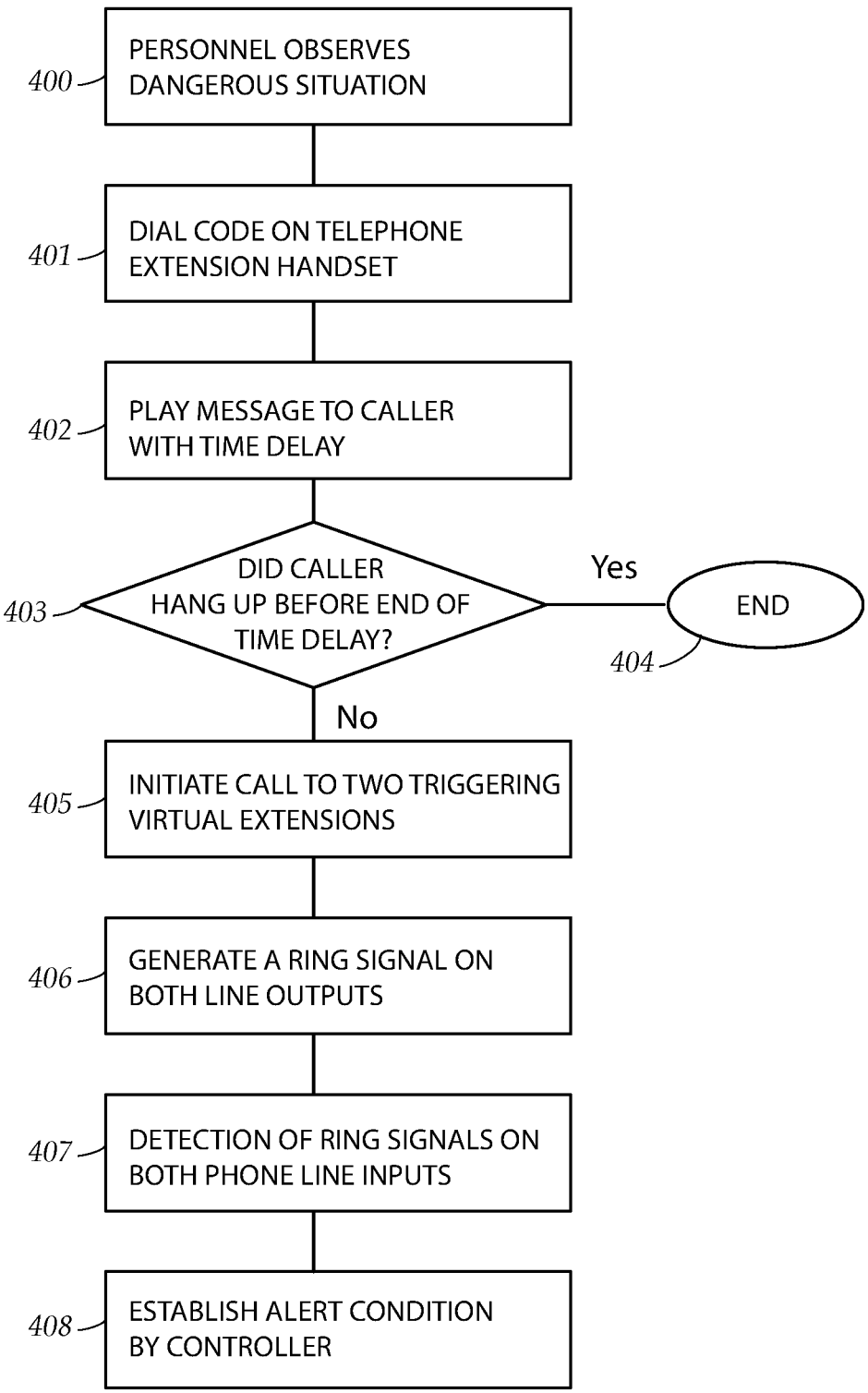
FIG. 4 is a flow diagram, illustrating steps in an activation procedure employing a telephone extension handset to signal an alert condition to the notification system controller, according to an embodiment of the present disclosure.

Referring to FIG. 4, by a preferred embodiment, when personnel observes a dangerous situation 400, they may dial a multi-digit code on one of the telephone extension handsets 401. Within the telephone system, that multi-digit code represents an initiating virtual extension. In response, the telephone system plays a recorded message to the caller such as "Lock Down initiating in 4 . . . 3 . . . 2 . . . 1 . . . Lock Down initiated" and simultaneously initiates a time delay that corresponds with the length of that message 402. The telephone system observes whether the caller hangs up before the end of the time delay 403. If the caller does hang up, the sequence ends 404. If the caller does not hang up, the telephone system initiates a call to two triggering virtual extensions 405. Internally dialing each of those triggering virtual extensions causes its associated ring generator to generate a ring signal on its associated line output. Thus, dialing both triggering virtual extensions causes the ring generators to generate ring signals on both line outputs 406. Then, the detection of ring signals on both phone line inputs by the controller 407 causes the alert condition to be established by the controller 408. Thus, safeguards against inadvertent activation are provided. In particular, if personnel inadvertently dialed one of the triggering virtual extensions, an alert condition would not be established—because both triggering virtual extensions must ring simultaneously for the controller to register an alert condition. Also, if the initiating virtual extension is inadvertently dialed, when the caller hears the message, and due to the time delay before the outgoing calls are placed to the triggering virtual extensions to initiate the alert condition, the alert condition can be easily avoided by simply hanging up the telephone extension handset.

Referring again to FIG. 3, when an alert condition is established, the alert unit 22 initiates a sequence of events to ensure that full appropriate notification is made automatically. No additional intervention by personnel is necessary for the system to carry out notification to the fullest extent possible. Such notification includes providing alert enabling signals and alert content signals. Alert enabling signals are used to enable warning devices 60, such as the warning lights 61, and to activate systems upon which content will be played, displayed or transmitted, such as the warning speakers 62, the warning displays 63, wireless remote notification transmitter 65, the telephone system 40, and paging system 30. The alert enabling signals may also be used to signal a door locking system to lock doors within the facility or perimeter doors of the facility.

The alert content signals may include analog voice recordings, packets of data representing digitized voice recordings, and textual data messages. Such voice recordings include voice recordings of audible warning messages that are provided for use by warning annunciators, such as: "Attention. Lock Down. Shelter in Place". The alert content signals may also include voice recordings that are provided to emergency personnel following dialing such personnel by the phone system 40 or by dialers provided within the controller itself 20. Calls can be placed automatically to pre-designated extensions within the phone system 40, as well as to cell phones and landlines. The alert content signals may also include textual data for display or transmission on various devices of the warning system 80, transmission by SMS or suitable messaging protocol to smartphones and other portable electronic devices, by email, by pop-up window or push notification on personal computing devices, and the like. Such notifications may occur directly by the controller 20, or may be accomplished through auxiliary hardware, such as the phone system 40. For example, the phone system 40 may run an application that provides pop-up notifications on personal computers within the facility, and those personal computers run an application or contain a plug-in or client that facilitates such notification. In addition, the phone system 40 may run an application that enables the paging system and/or plays the audible warning message through the paging system 30. The phone system 40 may also be configured to selectively interconnect the telephone network port and the paging system so that an incoming call from the POTS telephone network may be broadcast through the paging system 30 and through the warning speakers 62, thereby allowing law enforcement and other authorized personnel to speak directly to those in harm's way or to a perpetrator as necessary. The notification system 10 may be configured to provide a variety of automated notifications on any and all electronic devices within the facility and among interested parties outside of the facility, including voice calls, voice messages, text and video messages, emails, pop-ups, push notifications, facsimile transmissions, broadcasts by RF and infrared transmission, web pages, as well as other notification technologies presently or prospectively available.

Accordingly, by a preferred embodiment, once an alert condition is established, the warning lights 61 are activated, providing an attention getting presence that may include strobe and flashing lights. In addition, audible warning messages or attention getting signals/sirens are played through the paging speakers 32 and through the warning speakers 62. A warning message is displayed on the warning displays 63, such as "Lock Down—Shelter in Place". The police and other emergency services are dialed and an appropriate automated message is provided to them, regarding the emergency and the facility from which the message originated. Additional information may be provided in any and all such messages, such as the precise location from which the system was triggered by one of the triggering devices 80, or by one of the telephone extension handsets 42. In addition, when the alert condition originated from one of the event buttons 82, more specific information regarding the emergency may be provided through any and all notification channels, such as "active shooter" or "tornado spotted", or specific instructions such as "evacuation" or "shelter in place".

In a preferred embodiment, the facility is well covered by the warning lights 61, warning speakers 62, paging speakers 32, and warning displays 63 so that people within the facility are alerted visually and notified by a loud and clear audio recording of the alert condition. Such notification should cover outdoor areas, including athletic fields, parking lots, bus garages, or other remote structures, and even non-adjacent property. The warning lights 61 are especially important in locations that tend to have high ambient noise levels, such as cafeterias, gyms, and wood shops, to ensure that they will get everyone's attention. The warning lights 61 and warning speakers 62 are preferably placed at doorways to notify those that might be approaching the building of the alert condition therein.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an automated notification system, for providing comprehensive notification of an emergency situation throughout a facility. The disclosure is illustrated by example in the drawing figures, and throughout the written description. It should be understood that numerous variations are possible, while adhering to the inventive concept. Such variations are contemplated as being a part of the present disclosure.

What is claimed is:

1. A notification system controller, for connecting to a telephone system having at least two line outputs, and connecting to warning devices, comprising:
   a triggering unit, the triggering unit including a pair of phone line inputs, each phone line input having a ring detector associated therewith for detecting a ring signal on its associated phone line, the triggering unit determining an alert condition when both ring detectors simultaneously detect a ring signal on its associated phone line input; and
   an alert unit, for providing automated warnings upon the detection of the alert condition from the triggering unit, the automated warnings include alert enabling signals and alert content signals, the alert content signals including voice recordings of audible warning messages that are provided for use by warning devices.

2. The notification system controller as described in claim 1, further comprising a telephone network port, the controller providing dialing signals and alert content signals through the telephone network port, so that automated calls are placed by the controller in response to the alert condition that contain the audible warning messages.

3. The notification system controller as described in claim 2, further comprising a remote notification transmitter for wirelessly signalling warning devices that are not connected by a wired connection to the controller.

4. A notification system, for installation within a facility, comprising:
   a telephone system having two line outputs and a plurality of extension handsets for placement throughout the facility, the telephone system including an internal extension that when dialed by one of the extension handsets generates ring signals on both of the line outputs;
   a plurality of external warning devices for locating throughout the facility; and
   a controller having a triggering unit and an alert unit, the triggering unit including a pair of phone line inputs connected to the line outputs of the telephone system, each phone line input having a ring detector associated therewith for detecting a ring signal on its associated phone line, the triggering unit determining an alert condition when both ring detectors simultaneously detect a ring signal on its associated phone line input, the alert unit providing automated warnings upon the detection of the alert condition from the triggering unit, the automated warnings include alert enabling signals and alert content signals, the alert content signals including voice recordings of audible warning messages that are provided for use by warning devices.

5. The notification system as recited in claim 4, further comprising a paging system, the paging system having a plurality of paging speakers, wherein upon detection of the alert condition the paging system plays an audible warning message on the paging speakers.

6. The notification system as recited in claim 5, wherein the telephone system has a telephone network port, the telephone network port for allowing the telephone system to dial a telephone number and provide audible warning messages on the telephone network port upon the determination of the alert condition.

7. The notification system as recited in claim 6, further comprising triggering devices, for signaling the triggering unit to initiate the alert condition.

8. The notification system as recited in claim 7, wherein the alert condition includes a plurality of distinctive alert situations, and wherein the triggering device includes a plurality of event buttons, each event button is configured to indicate one of the distinctive alert situations, and wherein the controller provides distinct audible warning messages in response to the distinctive alert situation.

9. The notification system as recited in claim 8, further comprising at least one remote unit and a wireless transmitter, the remote unit has a warning device and is not hardwired to the controller, the wireless transmitter is connected to the controller to wirelessly transmit the automated warnings to the remote unit so that they may be conveyed through said warning device of said remote unit.

10. A notification system installation, comprising:
   a facility including a main building and auxiliary areas outside of the main building, the main building including hallways and a plurality of rooms;
   a telephone system having a pair of line outputs and a plurality of extension handsets that are positioned throughout the facility including in the rooms, the telephone system including an internal extension that provides a ring signal on both of the line outputs when the internal extension is dialed on one of the extension handsets;
   a plurality of external warning devices, including warning lights, warning speakers, and warning message displays located in the hallways;
   at least one triggering device located within one of the hallways; and
   a controller having a triggering unit and an alert unit, the triggering unit including a pair of phone line inputs connected to the pair of line outputs of the telephone system, having a ring detector associated with each phone line input for detecting a ring signal thereon, the triggering unit determining an alert condition when both ring detectors simultaneously detect a ring signal on its associated phone line input or when actuated by the at least one triggering device, the alert unit providing automated warnings to the external warning devices upon the detection of the alert condition from the triggering unit, the automated warnings include alert enabling signals and alert content signals, the alert content signals including voice recordings of audible warning messages that are provided on the warning speakers and visible messages displayed on the warning message displays; and
   at least one remote unit and a wireless remote notification transmitter, the remote unit is located outside of the main building, has a warning device, and is not hardwired to the controller, the wireless remote notification transmitter is connected to the controller to wirelessly transmit the automated warnings to the remote unit so that they may be conveyed through said warning device of said remote unit.

11. The notification system installation as recited in claim 10, wherein the facility has a POTS connection, wherein the telephone system has a telephone network port connected to the POTS connection, the telephone network port allowing the telephone system to dial a telephone number and provide audible warning messages to the POTS connection on the telephone network port upon the determination of the alert condition.

12. The notification system as recited in claim 11, further comprising a paging system, the paging system having a plurality of paging speakers located within the rooms and the hallways, wherein upon detection of the alert condition the pager system plays an audible warning message on the paging speakers.

13. The notification system as recited in claim 12, wherein the telephone system is configured to provide a connection between the telephone network port and the paging system such that an incoming call from the POTS connection may be provided to the paging system to broadcast on the paging speakers.

* * * * *